(12) United States Patent
Velazquez Alcantar et al.

(10) Patent No.: US 10,569,758 B2
(45) Date of Patent: Feb. 25, 2020

(54) SYSTEM AND METHOD FOR MODELING AND ESTIMATING ENGINE CRANKING TORQUE DISTURBANCES DURING STARTS AND STOPS

(71) Applicant: FORD GLOBAL TECHNOLOGIES, LLC, Dearborn, MI (US)

(72) Inventors: Jose Velazquez Alcantar, Rio Oso, CA (US); Rajit Johri, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/054,523

(22) Filed: Feb. 26, 2016

(65) Prior Publication Data
US 2017/0247025 A1    Aug. 31, 2017

(51) Int. Cl.
*B60W 20/10* (2016.01)
*B60L 15/20* (2006.01)
(Continued)

(52) U.S. Cl.
CPC ......... *B60W 20/10* (2013.01); *B60L 15/2054* (2013.01); *B60W 10/08* (2013.01); *B60W 20/00* (2013.01); *F02D 41/26* (2013.01); *F16H 63/50* (2013.01); *B60W 2510/0685* (2013.01); *B60W 2510/081* (2013.01); *B60W 2510/1015* (2013.01); *B60W 2510/1025* (2013.01); *B60Y 2200/92* (2013.01); *B60Y 2300/205* (2013.01); *F02D 41/009* (2013.01); *F02D 41/042* (2013.01); *F02D 41/062* (2013.01); *Y10S 903/906* (2013.01); *Y10S 903/915* (2013.01)

(58) Field of Classification Search
CPC ...... B60W 20/10; B60W 10/08; B60W 20/00; B60W 2510/0685; B60W 2510/081; B60W 2510/1015; B60W 2510/1025; B60L 15/2054; F02D 41/009; F02D 41/042; F02D 41/062; F02D 41/26; F02D 35/024; F02D 41/1497; F16H 63/50; B60Y 2200/92; B60Y 2300/205; Y10S 903/906; Y10S 903/915; Y10T 10/7258
USPC ......................................................... 701/22
See application file for complete search history.

(56) References Cited

U.S. PATENT DOCUMENTS 6,292,741 B1 *   9/2001   Bitzer ................... B60W 10/04
                                                          701/103
7,996,145 B2 *   8/2011   Snyder .................. B60W 20/15
                                                          123/179.5
(Continued)

OTHER PUBLICATIONS

Shuji Tomura et al., Development of Vibration Reduction Motor Control for Series-Parallel Hybrid System, SAE Technical Paper Series, 2006 SAE World Congress, Apr. 3-6, 2006, Detroit, Michigan. 10 pgs.

*Primary Examiner* — Angelina Shudy
(74) *Attorney, Agent, or Firm* — David B. Kelley; Brooks Kushman P.C.

(57) ABSTRACT

A method of controlling a hybrid vehicle includes commanding a first electric machine to provide a compensating torque. The compensating torque is based on a calculated cylinder pressure. The calculated cylinder pressure is calculated using a dynamic model. The model has an initializing input of engine crank position and real-time inputs of measured speed of the first electric machine and measured speed of the second electric machine.

6 Claims, 3 Drawing Sheets

(51) Int. Cl.
*B60W 10/08* (2006.01)
*B60W 20/00* (2016.01)
*F02D 41/26* (2006.01)
*F16H 63/50* (2006.01)
F02D 41/00 (2006.01)
F02D 41/04 (2006.01)
F02D 41/06 (2006.01)

(56) References Cited

U.S. PATENT DOCUMENTS

| | | | | |
|---|---|---|---|---|
| 8,219,303 | B2* | 7/2012 | Schwenke | B60K 6/445 701/111 |
| 8,528,388 | B2 | 9/2013 | Yutani et al. | |
| 8,849,460 | B2* | 9/2014 | Ye | B60W 10/08 700/275 |
| 8,939,127 | B1* | 1/2015 | Tsukada | F02D 41/042 123/376 |
| 9,108,637 | B2* | 8/2015 | Ruder | B60K 6/383 |
| 9,421,970 | B2* | 8/2016 | Tsukada | B60K 6/445 |
| 9,694,809 | B2* | 7/2017 | Ang | B60W 20/40 |
| 10,358,125 | B2* | 7/2019 | Yamazaki | B60W 10/08 |
| 2002/0171383 | A1* | 11/2002 | Hisada | B60K 6/445 318/432 |
| 2005/0205379 | A1* | 9/2005 | Tryon | F16D 25/0638 192/70.17 |
| 2005/0205381 | A1* | 9/2005 | Tryon | F16F 15/13135 192/106 F |
| 2005/0205382 | A1* | 9/2005 | Tryon | F16D 25/0638 192/214 |
| 2006/0055240 | A1* | 3/2006 | Toyota | B60K 6/365 303/152 |
| 2007/0084653 | A1* | 4/2007 | Hughes | B60K 6/48 180/65.31 |
| 2008/0236913 | A1* | 10/2008 | Ichimoto | B60K 6/365 180/65.265 |
| 2010/0133026 | A1* | 6/2010 | Kim | B60K 6/40 180/65.22 |
| 2011/0053718 | A1* | 3/2011 | Nonomura | F16H 61/66272 474/70 |
| 2011/0053733 | A1* | 3/2011 | Swales | B60W 10/08 477/3 |
| 2012/0215392 | A1* | 8/2012 | Hashimoto | B60W 10/02 701/22 |
| 2012/0295757 | A1* | 11/2012 | Watanabe | B60W 10/06 477/4 |
| 2013/0012353 | A1* | 1/2013 | Yoshida | B60K 6/48 477/5 |
| 2013/0197740 | A1* | 8/2013 | Hagel | F16F 15/002 701/32.1 |
| 2013/0226384 | A1* | 8/2013 | Tanishima | B60L 11/123 701/22 |
| 2013/0233268 | A1* | 9/2013 | Yamaguchi | F02D 29/02 123/179.3 |
| 2013/0289810 | A1* | 10/2013 | Holmes | B60K 6/24 701/22 |
| 2013/0296109 | A1* | 11/2013 | Nedorezov | B60W 10/06 477/5 |
| 2013/0325185 | A1* | 12/2013 | Ye | B60W 10/08 700/275 |
| 2013/0325234 | A1* | 12/2013 | Shibata | B60W 20/106 701/22 |
| 2014/0136039 | A1* | 5/2014 | Tanishima | B60K 6/48 701/22 |
| 2014/0277977 | A1* | 9/2014 | Neelakantan | F16D 48/06 701/68 |
| 2014/0296027 | A1* | 10/2014 | Takahashi | B60W 10/026 477/5 |
| 2014/0349807 | A1* | 11/2014 | Heap | B60W 20/10 477/3 |
| 2014/0378275 | A1* | 12/2014 | Heap | B60W 10/11 477/75 |
| 2015/0112523 | A1* | 4/2015 | Wang | B60W 20/40 701/22 |
| 2016/0047435 | A1* | 2/2016 | Voegtle | F16D 3/12 464/66.1 |
| 2016/0059846 | A1* | 3/2016 | Wang | B60W 20/40 477/5 |
| 2016/0096523 | A1* | 4/2016 | Ang | B60W 20/40 701/22 |
| 2016/0208761 | A1* | 7/2016 | Nagai | B60K 6/387 |
| 2016/0215480 | A1* | 7/2016 | Ishihara | E02F 9/2075 |
| 2016/0347306 | A1* | 12/2016 | Oyama | B60W 10/08 |
| 2016/0355173 | A1* | 12/2016 | Tajima | B60K 6/48 |
| 2018/0257633 | A1* | 9/2018 | Meyer | B60W 20/13 |
| 2018/0257635 | A1* | 9/2018 | Meyer | B60W 20/15 |
| 2018/0266516 | A1* | 9/2018 | Ito | F16F 15/134 |
| 2019/0048995 | A1* | 2/2019 | Sasade | F16H 59/14 |
| 2019/0048999 | A1* | 2/2019 | Sato | B60W 20/30 |
| 2019/0232941 | A1* | 8/2019 | Wang | B60W 10/023 |

* cited by examiner

SYSTEM AND METHOD FOR MODELING AND ESTIMATING ENGINE CRANKING TORQUE DISTURBANCES DURING STARTS AND STOPS

TECHNICAL FIELD

The present disclosure relates to hybrid electric vehicles having an internal combustion engine and at least one electric machine.

BACKGROUND

Hybrid electric vehicles (HEVs) include an internal combustion engine, one or more electric machines, and a traction battery that at least partially powers the electric machine. Plug-in hybrid electric vehicles (PHEVs) are similar to HEVs, but the traction battery in a PHEV is capable of recharging from an external electric power source. Generally speaking, both HEVs and PHEVs are capable of operating in an electric-only mode with the engine off. Thus, the engine may stop and start in response to various operating conditions during a drive cycle, including battery state of charge, climate control requirements, and electric accessory draw.

SUMMARY

A method of controlling a hybrid vehicle includes commanding a first electric machine to provide a compensating torque. The compensating torque is based on a cylinder pressure output from a dynamic model. The model has an initializing input of engine crank position and real-time inputs of measured speed of the first electric machine and measured speed of the second electric machine.

According to a first embodiment, commanding the first electric machine to provide a compensating torque includes commanding the first electric machine to produce a combined torque equal to a sum of a baseline torque and an incremental torque. The baseline torque may correspond to a required torque to satisfy a driver torque request, and may be obtained from a speed control feedback loop. The incremental torque is equal in magnitude and opposite to a transmission input torque corresponding to the calculated cylinder pressure.

According to a second embodiment, the measured speed of the first electric machine and the measured speed of the second are the only real-time inputs to the model.

According to a third embodiment, the dynamic model includes a calculated transmission input member speed.

A hybrid vehicle according to the present disclosure includes an internal combustion engine, a first electric machine, a second electric machine, and a controller. The controller is configured to control the first electric machine to provide a compensating torque based on a cylinder pressure output from a dynamic model. The model has an initializing input of engine crank position and real-time inputs of measured speed of the first electric machine and measured speed of the second electric machine.

According to a first embodiment, the controller is configured to control the first electric machine to provide a compensating torque by commanding the first electric machine to produce a combined torque equal to a sum of a baseline torque and an incremental torque. The baseline torque may correspond to a required torque to satisfy a driver torque request, and may be obtained from a speed control feedback loop. The incremental torque is equal and opposite to a transmission input torque corresponding to the calculated cylinder pressure.

According to a second embodiment, the measured speed of the first electric machine and the measured speed of the second are the only real-time inputs to the model.

According to a third embodiment, the dynamic model includes a calculated transmission input member speed.

A method of controlling a hybrid vehicle which has first and second electric machines according to the present disclosure includes commanding the first electric machine to provide a compensating torque in response to an engine start event or engine stop event. The compensating torque pulse is based on a transmission input torque output from a dynamic engine model. The dynamic engine model uses measured speeds of the first and second electric machines as real-time inputs.

According to a first embodiment, the dynamic model uses measured engine crank position as an initializing input. The dynamic model may only the measured speeds of the first and second electric machines as real-time inputs and only the measured engine crank position as an initializing input.

According to a second embodiment, the compensating torque pulse is equal in magnitude and opposite in direction of the calculated transmission input torque.

According to a third embodiment, the torque pulse is commanded in addition to a baseline torque to satisfy current vehicle power requirements. The baseline torque may be obtained from a speed control feedback loop associated with a speed control mode of the first electric machine.

Embodiments according to the present disclosure provide a number of advantages. For example, the present disclosure provides a system and method for compensating for cranking torque disturbances in an engine, thus reducing noise, vibration, and harshness (NVH) and increasing customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
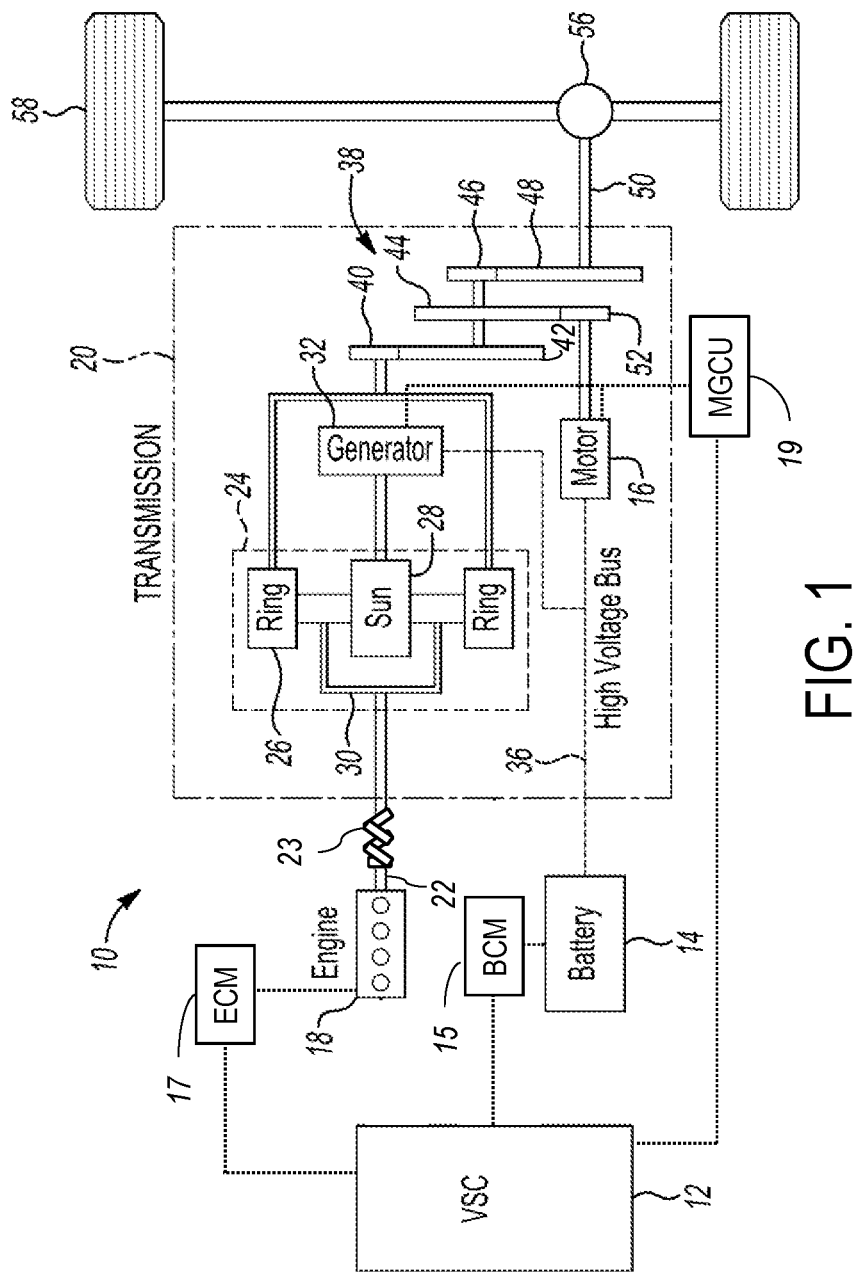
FIG. 1 is a schematic representation of a vehicle according to the present disclosure.

Referring to FIG. 1, vehicle 10 includes a power-split powertrain. A vehicle system controller (VSC) 12 is provided. The VSC 12 controls the power distribution in the powertrain of the vehicle 10. A battery 14 is provided and is controlled by a battery control module (BCM) 15. The BCM 15 is in communication with or under the control of the VSC 12 via a controller area network (CAN) bus. The battery 14 has a two-way electrical connection, such that it receives and stores electric energy through regenerative braking, for example, and also supplies the energy to an electric traction motor 16. The VSC 12 also communicates with or controls an engine control module (ECM) 17 via the CAN bus, which in turn controls the operation of an internal combustion engine (ICE) 18. Both the motor 16 and the engine 18 are capable of powering a transmission 20 that ultimately delivers torque to the wheels of the vehicle 10.

The engine 18 delivers power to a torque input shaft 22 that is connected to a planetary gear set 24 through a torsional damper 23. The input shaft 22 powers the planetary gear set 24. The planetary gear set 24 includes a ring gear 26, a sun gear 28, and a planetary carrier assembly 30. The input shaft 22 is driveably connected to the carrier assembly 30 which, when powered, can rotate the ring gear 26 and/or the sun gear 28. The sun gear 28 is driveably connected to a generator 32. The generator 32 can be engaged with the sun gear 28, such that the generator 32 can either rotate with the sun gear 28, or not rotate with it. The motor 16 and the generator 32 can be referred to as first and second electric machines. Each electric machine 16, 32 is capable of both generating electric power and providing motive power. A motor-generator control unit (MGCU) 19 controls operation of the motor 16 and the generator 32, and is in communication with or under the control of the VSC 12 via the CAN bus.

When the engine 18 is coupled to the planetary gear set 24, the generator 32 generates energy as a reactionary element to the operation of the planetary gear set 24. Electric energy generated from the generator 32 is transferred to the battery 14 through electrical connections 36. The battery 14 also receives and stores electric energy through regenerative braking, wherein torque is transmitted from the wheels and back through the transmission 20, into the generator 32 and stored in the battery 14. The battery 14 supplies the stored electric energy to the motor 16 for operation. The portion of the power delivered from the engine 18 to the generator 32 can also be transmitted directly to the motor 16. The battery 14, motor 16, and generator 32 are each interconnected in a two-way electric flow path through electrical connections 36 that can include a high voltage bus.

The vehicle can be powered by the engine 18 alone, by the battery 14 and motor 16 alone, or by a combination of the engine 18 with the battery 14 and motor 16. In a mechanical drive mode, or a first mode of operation, the engine 18 is activated to deliver torque through the planetary gear set 24. The ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the mechanical drive mode, the motor 16 can also be activated to assist the engine 18 in powering the transmission 20. When the motor 16 is active in assisting, gear 52 distributes torque to gear 44 and to the countershaft. Generally, the generator 32 is used in a speed control mode to control engine speed and charge the battery, while the motor is used in torque control mode to deliver the desired drive torque and regenerative braking torque.

In an electric drive mode (EV mode), or a second mode of operation, the engine 18 is disabled or otherwise prevented from distributing torque to the torque output shaft 50. In the EV mode, the battery 14 powers the motor 16 to distribute torque through gear 52, step ratio gears 38 and the torque output shaft 50. The torque output shaft 50 is connected to a differential and axle mechanism 56 which distributes torque to traction wheels 58. The VSC 12 controls the battery 14, engine 18, motor 16 and generator 32, e.g. by issuing commands to the BCM 15, ECM 17, and MGCU 19, in order to distribute torque to the wheels 58 in either the mechanical drive mode or the EV mode. The VSC 12 commands the amount of power output by each of the power sources such that driver demand is fulfilled.

The VSC 12, BCM 15, ECM 17, and MGCU 19 may each include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

As previously described, there are two power sources for the driveline. The first power source is the engine 18, which delivers torque to the planetary gear set 24. The other power source involves only the electric drive system, which includes the motor 16, the generator 32 and the battery 14, in which the battery 14 acts as an energy storage medium for the generator 32 and the motor 16. The generator 32 can be driven by the planetary gear set 24, and can alternatively act as a motor and deliver power to the planetary gear set 24. Either or both of the motor 16 and the generator 32 can be referred to as motors, generators, and/or electric machines, as both are capable of delivering and absorbing energy.

It should be understood that while a power-split powertrain is illustrated in the vehicle 10, the vehicle 10 can include many other configurations. As such, it is contemplated that individual components of the powertrain can differ to suit various particular applications. Other vehicle configurations of vehicle powertrains and implementations of electric machines are therefore considered to be within the scope of the present disclosure.

Due to the fact that the Power Split drivetrain does not use a conventional torque converter, the engine 18 is always directly connected to the drive wheels 58 with relatively little damping in the system. As a result, any disturbances produced by the engine 18 can be propagated to the drive wheels 58, and thus to the driver, if not properly compensated by the drivetrain control system. During engine starts and stops, the torque disturbance from pumping or compression during the cranking phase may excite the engine damper and driveline resonant frequencies, resulting in NVH in the driveline which may ultimately be felt by the driver.

Embodiments according to the present disclosure implement a simple cylinder-based dynamic mathematical model of the engine 18 coupled with the torsional damper 23 to predict the cranking torque disturbance produced by the engine 18 during engine starts and stops, as will be discussed in further detail below. The cranking torque disturbance calculated by the engine math model may then be used as a feedforward term in the generator speed control feedback loop to produce a torque on the sun gear 28 to cancel out the disturbance torque generated by the engine 18 on the carrier 30.

Figure 2:
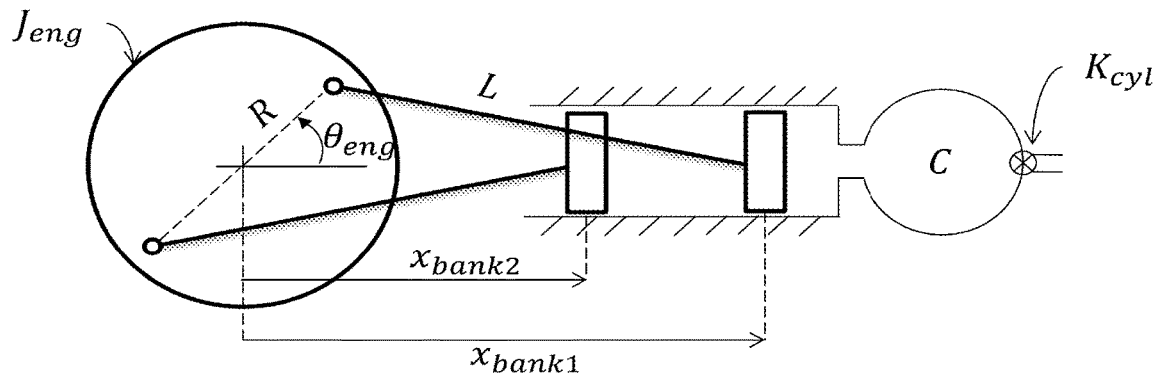
FIG. 2 is a schematic representation of an engine according to the present disclosure.

Referring now to FIG. 2, a general schematic of an engine with a flat-plane crankshaft is shown. As shown in FIG. 2, $\theta_{eng}$ refers to the engine crank angle, $J_{eng}$ is the engine lumped inertia, R represents the crankpin radius, L is the connecting rod length, $x_{bank1}$ and $x_{bank2}$ are the positions of the first bank (bank 1) and second bank (bank 2) pistons, respectively, as measured from the crank centerline. Finally, C represents the compliance of the air trapped in the cylinder. $K_{cyl}$ can be thought of as a control valve that can expose individual cylinders to atmosphere.

Embodiments according to the present disclosure lump the engine damper with the engine model. The lumped system has one input, the carrier speed on the input side of the engine damper. The entire engine is lumped into one inertia and the pistons are assumed massless. The kinematic constraints between the engine speed, $\omega_{eng}$, and the piston velocities are given in Equations 1 and 2 below.

$$\dot{x}_{bank1} = \left( -R\sin(\theta_{eng}) - \frac{R^2 \sin(\theta_{eng})\cos(\theta_{eng})}{L\sqrt{1 - \frac{R^2}{L^2}\sin^2(\theta_{eng})}} \right)\omega_{eng} = m_{bank1}(\theta_{eng})\omega_{eng} \quad (1)$$

$$\dot{x}_{bank2} = \left( R\sin(\theta_{eng}) - \frac{R^2 \sin(\theta_{eng})\cos(\theta_{eng})}{L\sqrt{1 - \frac{R^2}{L^2}\sin^2(\theta_{eng})}} \right)\omega_{eng} = m_{bank2}(\theta_{eng})\omega_{eng} \quad (2)$$

Figure 3:
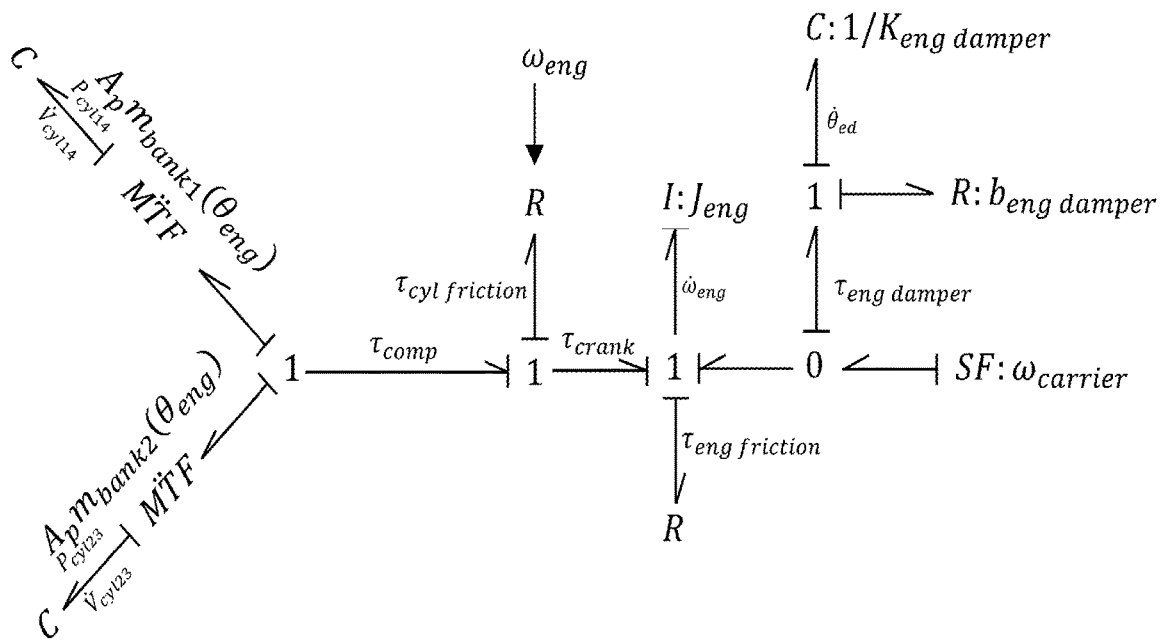
FIG. 3 is a bond graph representation of an engine system model according to the present disclosure.

Given the kinematic constrains above and the piston area, $A_p$, a bond graph mathematical model representation is derived as represented in FIG. 3. As may be seen, the bond graph model uses one input, the carrier speed $\omega_{carrier}$, and outputs four nonlinear ordinary differential equations which describe the system. With the inclusion of the crank angle $\theta_{eng}$, the state space may be expanded to five as shown in Equations 3-7 below.

$$\dot{\theta}_{eng\_damper} = \omega_{carrier} - \omega_{eng} \quad (3)$$

$$\dot{\omega}_{eng} = \frac{1}{J_{eng}}(\tau_{eng\_damper} - \tau_{eng\_friction}(\omega_{eng}) + \tau_{crank}) \quad (4)$$

$$\dot{V}_{cyl14} = A_p m_{bank1}(\theta_{eng})\omega_{eng} \quad (5)$$

$$\dot{V}_{cyl23} = A_p m_{bank2}(\theta_{eng})\omega_{eng} \quad (6)$$

$$\dot{\theta}_{eng} = \omega_{eng} \quad (7)$$

As used in Equation 4, the term $\tau_{eng\_frictio}(\omega_{eng})$ represents engine friction and is a function of engine speed $\omega_{eng}$. Furthermore, $\tau_{eng\_damper}$ and $\tau_{crank}$ represent the engine damper torque and cranking torque disturbance, respectively, which may be calculated as shown in Equations 8 and 9, respectively.

$$\tau_{eng\_damper} = K_{eng\_damper}\theta_{eng\_damper} + b_{eng\_damper}(\omega_{carrier} - \omega_{eng}) \quad (8)$$

$$\tau_{crank} = -A_p m_{bank1}(\theta_{eng})(P_{cyl1} + P_{cyl4}) - A_p m_{bank2}(\theta_{eng})(P_{cyl2} + P_{cyl3}) - \tau_{cyl\_friction}(\theta_{eng}, \omega_{eng}) \quad (9)$$

In Equation 8, the engine damper is modeled as a linear spring, with a spring constant $K_{eng\_damper}$, and a damper, with a damping coefficient $b_{eng\_damper}$. However, the engine damper may alternatively be modeled as a general nonlinear function operating on the engine damper displacement and relative velocity as shown in Equation 10.

$$\tau_{eng\_damper} = f(\theta_{eng_{damper}}, (\omega_{carrier} - \omega_{eng})) \quad (10)$$

In Equation 9, $\tau_{cyl\_frictio}(\theta_{eng}, \omega_{eng})$ represents the torque resulting from cylinder friction. This torque may be modeled as a general function of engine position, $\theta_{eng}$, and engine speed $\omega_{eng}$. The individual cylinder pressures $P_{cyl,1-4}$ may be calculated using the isentropic compression/expansion law for a closed system, as shown in equation 11.

$$P_1 = P_1 \left( \frac{V_2}{V_1} \right)^\gamma \quad (11)$$

Closed system cylinder pressures are first calculated for each bank. For this particular four-cylinder example, bank 1 corresponds to cylinders 1 & 4 and bank 2 corresponds to cylinder 2 & 3. Thus, the closed system cylinder pressures may be calculated as shown in Equations 12 and 13.

$$P_{cyl14} = K_{cyl}P_{atm}\left(\frac{V_0}{V_{cyl14,inst}}\right)^\gamma \quad (12)$$

$$P_{cyl23} = K_{cyl}P_{atm}\left(\frac{V_0}{V_{cyl23,inst}}\right)^\gamma \quad (13)$$

In the above expressions, $\gamma$ is the specific heat ratio of the working fluid and $K_{cyl}$ is a calibratable gain used to tune the system. $P_{atm}$ represents atmospheric pressure, $V_0$ represents the total volume of the cylinder from bottom dead center (BDC) to the top of the cylinder head and $V_{cyl14,inst}$ and $V_{cyl23,inst}$ represent the instantaneous volumes of the cylinders in the first and second banks, respectively. The instantaneous cylinder volumes are a function of the model states, $V_{cyl14}$ and $V_{cyl23}$, and may be calculated as shown in Equations 14 and 15.

$$V_{cyl14,inst} = V_0 - (V_{cyl14} - A_p(L-R)) \quad (14)$$

$$V_{cyl23,inst} = V_0 - (V_{cyl23} - A_p(L-R)) \quad (15)$$

The final cylinder pressures ($P_{cyl,1-4}$) may be calculated by running the closed system cylinder pressures ($P_{cyl14}$, $P_{cyl23}$) through the valve-timing algorithm shown in Equation 16.

Bank 1:

$$P_{cyl,i} = \begin{cases} P_{atm} & \text{if } \theta_{start} \leq \theta_{cyl,i} \leq \theta_{end} \\ P_{cyl14} & \text{otherwise} \end{cases}, i = 1, 4 \quad (16)$$

Bank 2:

$$P_{cyl,i} = \begin{cases} P_{atm} & \text{if } \theta_{start} \leq \theta_{cyl,i} \leq \theta_{end} \\ P_{cyl23} & \text{otherwise} \end{cases}, i = 2, 3$$

As used in Equation 16, $\theta_{cyl}$, refers to the crank angle position of piston i. $\theta_{start}$ and $\theta_{end}$ refer to the crank angles that describe when the system is first exposed to atmosphere (opening of exhaust valve) and when it is closed from atmosphere (closing of intake valve), respectively. Moreover, $\theta_{start}$ and $\theta_{end}$ may also be calibratable tuning factors. The valve-timing algorithm shown in Equation 16 provides that if the crank angle position of cylinder i falls within the crank angle range where cylinder i is exposed to atmosphere, the final pressure in cylinder i is set to atmospheric pressure. Moreover, the valve-timing algorithm in Equation 16 provides that if the crank angle position of cylinder i does not fall within the crank angle range where cylinder i is exposed to atmosphere, the final pressure in cylinder i is calculated as a closed system using the relevant expression of Equation 12 or Equation 13.

The final cranking torque can thus be calculated as described in Equation 9. The generalized cranking torque expression can be given as Equation 17.

$$\tau_{crank} = -A_p m_{bank1}(\theta_{eng})(\Sigma P_{cyl,bank1}) - A_p m_{bank2}(\theta_{eng}) (\Sigma P_{cyl,bank2}) - \tau_{cyl\_friction}(\theta_{eng}, \omega_{eng}) \quad (17)$$

As used in Equation 17, $\Sigma P_{cyl,ank1}$ and $\Sigma P_{cyl,bank2}$ represent the summation of the individual cylinders contained in bank 1 and bank 2, respectively. The individual cylinder pressures for banks 1 and 2 may be calculated using the routine described in Equations 12-16 with the appropriate cylinder number notation used on each side. Moreover, the same five state equations, Equations 3-7, are retained even for an engine with n amount of pistons as long as the engine uses a flat plane crankshaft.

As may be seen, the above-described model requires only one initializing input, namely engine crank position, and one real-time input, carrier speed, i.e. input speed to the transmission 20. However, carrier speed is preferably calculated as a function of speed of the generator 32 and speed of the motor 16, based on gear ratios associated with the planetary gear set 24. Advantageously, this enables more precise measurements, because resolvers associated with the motor 16 and generator 32 are generally more accurate than a crank angle sensor associated with the engine 18.

Once calculated, the cranking torque $\tau_{crank}$ may be compensated by a counter-torque from the generator 32 or motor 16. The compensation may include controlling the generator 32 or motor 16 providing a sum of a baseline torque and an incremental torque. The baseline torque corresponds to a torque required to satisfy current vehicle power demand. The incremental torque is equal in magnitude but opposite in direction of the calculated torque at the transmission input member, or the calculated cranking torque modified by the calculated engine damper torque. In the embodiment shown in FIG. 1, the torque at the transmission input member is the torque at the carrier 30. In a preferred embodiment, the cranking torque $\tau_{crank}$ is compensated by the generator 32 due to relative proximity to the engine 18.

As an additional advantage, the dynamic model described above may account for time-dependent changes in the state of the system, whereas known methods use static models in conjunction with a look-up table and are less responsive.

As a further advantage, the steps of measuring speed of the generator 32 and the motor 16, calculating the cranking torque, and controlling the motor 16 or generator 32 to compensate for the cranking torque may all be performed by the MGCU 19. By performing all steps within the MGCU 19, CAN bus transmission delays among the various controllers are minimized.

Figure 4:
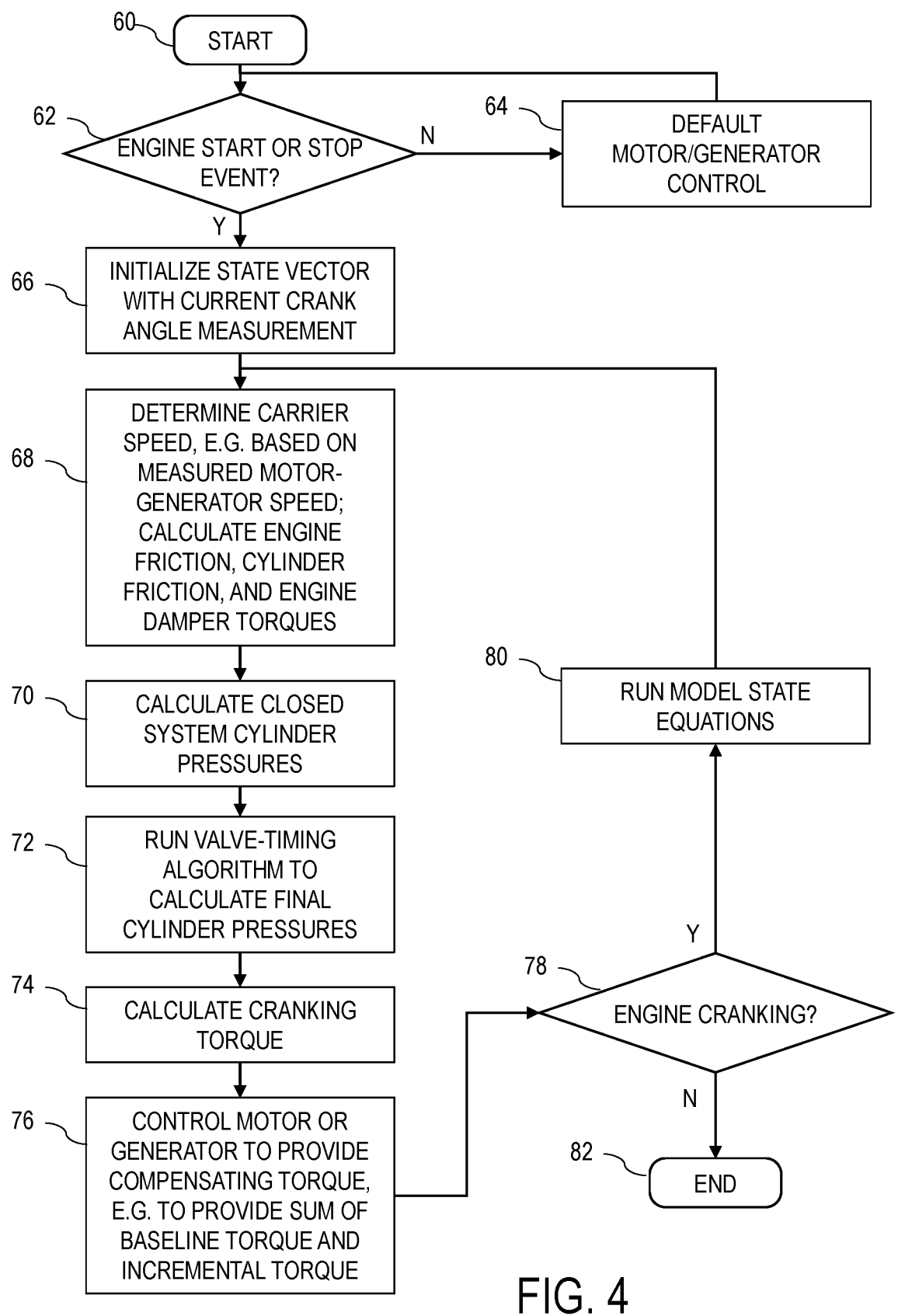
FIG. 4 is a flowchart illustrating a method of controlling a vehicle according to the present disclosure.

Referring now to FIG. 4, a method of controlling a vehicle according to the present disclosure is provided in flowchart form. The method begins at block 60.

At operation 62, a determination is made of whether an engine start or stop event is occurring, e.g. whether the engine is cranking. If the determination is negative, i.e. no start or stop event is occurring, then control proceeds to block 64. As illustrated at block 64, the motor 16 and generator 32 are controlled according to a default control logic. Control then returns to operation 62. Thus, unless and until an engine start or stop event occurs, the motor 16 and generator 32 are controlled according to default logic.

Returning to operation 62, if the determination is positive, i.e. an engine start or stop event is occurring, then control proceeds to block 66. As illustrated at block 66, a state vector x is initialized with a current crank angle measurement θ. The current crank angle measurement θ may be obtained from, for example, an engine crank angle sensor. The state vector x represents a current piston position, and thus cylinder volume, as discussed above and illustrated in FIG. 2, and is a function of the crank angle measurement θ. Control then proceeds to block 68.

As illustrated at block 68, a current carrier speed is determined. This may include calculating carrier speed as a function of measured speeds of the motor 16 and generator 32 and based on gearing ratios associated with the planetary gear set 24. In addition, engine friction torque is calculated, e.g. as a function of engine speed as discussed above. Cylinder friction torque is also calculated, e.g. as a function of calculated engine speed and calculated crank position as discussed above. Furthermore, engine damper torque is calculated, e.g. based on position of the engine damper, carrier speed, and engine speed as discussed above and shown in Equation 8. Control then proceeds to block 70.

As illustrated at block 70, closed system cylinder pressures are calculated, e.g. as discussed above and shown in Equations 12 and 13. Control then proceeds to block 72.

As illustrated at block 72, a valve-timing algorithm is run to calculate final cylinder pressures, e.g. as discussed above and shown in Equation 16. Control then proceeds to block 74.

As illustrated at block 74, cranking torque is calculated, e.g. as discussed above and shown in Equation 17. Control then proceeds to block 76.

As illustrated at block 76, the motor 16 or generator 32 is controlled to provide a compensating torque. This may include controlling the motor 16 or the generator 32 to provide a sum of a baseline torque and an incremental torque. The baseline torque corresponds to a torque required to satisfy current vehicle power demand, and may be substantially non-zero based on current vehicle speed and vehicle power demand. The incremental torque is equal in magnitude but opposite in direction of the calculated carrier torque, i.e. the calculated cranking torque modified by the calculated engine damper torque. Control then proceeds to operation 78.

As illustrated at operation 78, a determination is made of whether the engine is still cranking. If the determination is positive, i.e. the engine is still cranking, then control proceeds to block 80.

As illustrated at block 80, the model state equations are run, e.g. as discussed above and shown at Equations 3-7. Control then proceeds back to block 68. Thus, unless and until the engine completes the start or stop event, i.e. until cranking is complete, the engine cranking torque continues to be calculated from the model, and the motor 16 or generator 32 is controlled to compensate for the cranking torque.

Returning to operation 78, if the determination is negative, i.e. the engine is no longer cranking, then control proceeds to block 82 and the algorithm ends.

As may be seen, the present disclosure provides a system and method for compensating for cranking torque disturbances in an engine, thus reducing noise, vibration, and harshness and increasing customer satisfaction. Moreover, by implementing a dynamic model with a limited number of inputs, systems according to the present disclosure may provide these advantages with a high rate of response.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

What is claimed is:

1. A method of controlling a hybrid vehicle including a series connected engine and torsional damper, comprising:
   controlling an electric machine to provide a compensating torque, that is a sum of a baseline torque and an incremental torque, to offset cranking torque disturbances generated by the engine during engine start, wherein the baseline torque corresponds to a torque required to satisfy power demand of the hybrid vehicle and wherein the incremental torque is equal in magnitude but opposite in direction to a calculated cranking torque of the engine modified by a calculated engine damper torque of the torsional damper.

2. The method of claim 1, wherein the electric machine is controlled in a speed control mode and wherein the baseline torque is obtained from a speed control feedback loop.

3. The method of claim 1, wherein the calculated cranking torque and calculated engine damper torque are output from a model.

4. A hybrid vehicle comprising:
   an engine;
   a torsional damper in series with the engine;
   an electric machine; and
   a controller configured to control the electric machine to provide a compensating torque, that is a sum of a baseline torque and an incremental torque, to offset cranking torque disturbances generated by the engine during engine start, wherein the baseline torque corresponds to a torque required to satisfy power demand of the hybrid vehicle and wherein the incremental torque is equal in magnitude but opposite in direction to a calculated cranking torque of the engine modified by a calculated engine damper torque of the torsional damper.

5. The hybrid vehicle of claim 4, wherein the controller is further configured to control the electric machine in speed control mode, and wherein the baseline torque is obtained from a speed control feedback loop.

6. The hybrid vehicle of claim 4, wherein the calculated cranking torque and calculated engine damper torque are output from a dynamic model.

* * * * *